(12) United States Patent
Ban

(10) Patent No.: US 7,472,592 B2
(45) Date of Patent: Jan. 6, 2009

(54) AIRFLOW METER

(75) Inventor: Takao Ban, Toyohashi (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/952,299

(22) Filed: Dec. 7, 2007

(65) Prior Publication Data

US 2008/0173099 A1 Jul. 24, 2008

(30) Foreign Application Priority Data

Jan. 19, 2007 (JP) ............... 2007-10714

(51) Int. Cl.
*G01F 1/68* (2006.01)
(52) U.S. Cl. ................... 73/204.26
(58) Field of Classification Search ............ 73/204.25, 73/204.15, 204.17
See application file for complete search history.

(56) References Cited

U.S. PATENT DOCUMENTS 6,349,596 B1  2/2002  Nakada et al.
6,871,538 B2 *  3/2005  Fujiwara et al. .......... 73/204.26
7,360,415 B2 *  4/2008  Nakano et al. .......... 73/204.26
2008/0008224 A1  1/2008  Matsuura et al.

FOREIGN PATENT DOCUMENTS

JP  11-118557  4/1999

OTHER PUBLICATIONS

U.S. Appl. No. 11/318,553 of Matsuura, filed Dec. 28, 2005.

* cited by examiner

*Primary Examiner*—Jewel Thompson
(74) *Attorney, Agent, or Firm*—Nixon & Vanderhye PC

(57) ABSTRACT

An airflow meter includes a detecting element for detecting airflow rate, a control integrated circuit electrically coupled with the detecting element, a circuit board having a first surface and a second surface opposing each other, and having the control integrated circuit on the first surface, a heat sink arranged on a side of the second surface, and a shield part arranged between the circuit board and the heat sink. The heat sink has an electrically conductive property and is provided for removing heat from the control integrated circuit. In addition, the heat sink is floated from a ground. The shield part has an electrically conductive property and is electrically grounded.

9 Claims, 4 Drawing Sheets

AIRFLOW METER

CROSS REFERENCE TO RELATED APPLICATION

This application is based on Japanese Patent Application No. 2007-10714 filed on Jan. 19, 2007, the content of which is incorporated herein by reference in its entirety.

BACKGROUND OF THE INVENTION

1. Field of the Invention

The present invention relates to an airflow meter for detecting an airflow rate.

2. Description of the Related Art

Conventionally, an airflow meter is used for detecting rate of air drawn into an engine, for example. A detection signal produced by the airflow meter can be used for controlling various elements such as fuel injection.

For example, as shown in FIG. 4, JP 11-118557 A discloses an airflow meter 100 that includes a circuit board 101, a control integrated circuit (IC) 103 disposed on an upper surface of the circuit board 101, and a heat sink 102 attached on a lower surface of the circuit board 101. The heat sink 102 is made of a metal and protects the control IC 103 from heat generated by an operation of a transistor and the like. The heat sink 102 also functions as an attachment part of the airflow meter 100 to a passage member 105, which defines an air passage 104.

The heat sink 102 is coupled with a ground circuit part 107 through a first bonding wire 106. The ground circuit part 107 is also coupled with a connector terminal 108 through a second bonding wire 109.

In this airflow meter 100, when the heat sink 102 receives a noise from another electric equipment (i.e., external noise), the received external noise may easily enter the control IC 103. Thus, this airflow meter 100 cannot meet to a high electromagnetic compatibility (EMC) required in recent years. Furthermore, when the heat sink 102 is supplied with a high voltage by error, the second bonding wire 109 may melt down.

As shown in FIG. 5, U.S. patent application Ser. No. 11/318,553 (corresponding to JP 2006-184145 A) filed on Dec. 28, 2005 discloses another airflow meter 100, in which the heat sink 102 is not coupled with the ground circuit part 107 and floats electrically. This airflow meter 100 can prevent an external noise from entering the control IC 103. However, this airflow meter 100 cannot release static electricity stored in the heat sink 102, thereby a noise due to a charge of the heat sink 102 (i.e., internal noise) may affect the control IC 103.

SUMMARY OF THE INVENTION

It is therefore an object of the present invention to provide an airflow meter that can prevent an external noise and an internal noise from affecting a control IC.

An airflow meter according to an aspect of the invention includes a detecting element for detecting airflow rate, a control integrated circuit electrically coupled with the detecting element, a circuit board having a first surface and a second surface opposing each other, and having the control integrated circuit on the first surface, a heat sink arranged on a side of the second surface, and a shield part arranged between the circuit board and the heat sink. The heat sink has an electrically conductive property and is provided for removing heat from the control integrated circuit. In addition, the heat sink is floated from a ground. The shield part has an electrically conductive property and is electrically grounded.

In this airflow meter, even when the heat sink is put in an electrically floating state to be prevented from receiving an external noise, and static electricity cannot be released from the heat sink, an internal noise due to a charge of the heat sink is shielded by the shield part. Thereby, this airflow meter prevents the external noise and the internal noise from affecting the control IC.

BRIEF DESCRIPTION OF THE DRAWINGS

Additional objects and advantages of the present invention will be more readily apparent from the following detailed description of preferred embodiment when taken together with the accompanying drawings. In the drawings.

DETAILED DESCRIPTION OF THE PREFERRED EMBODIMENT

Figure 1:
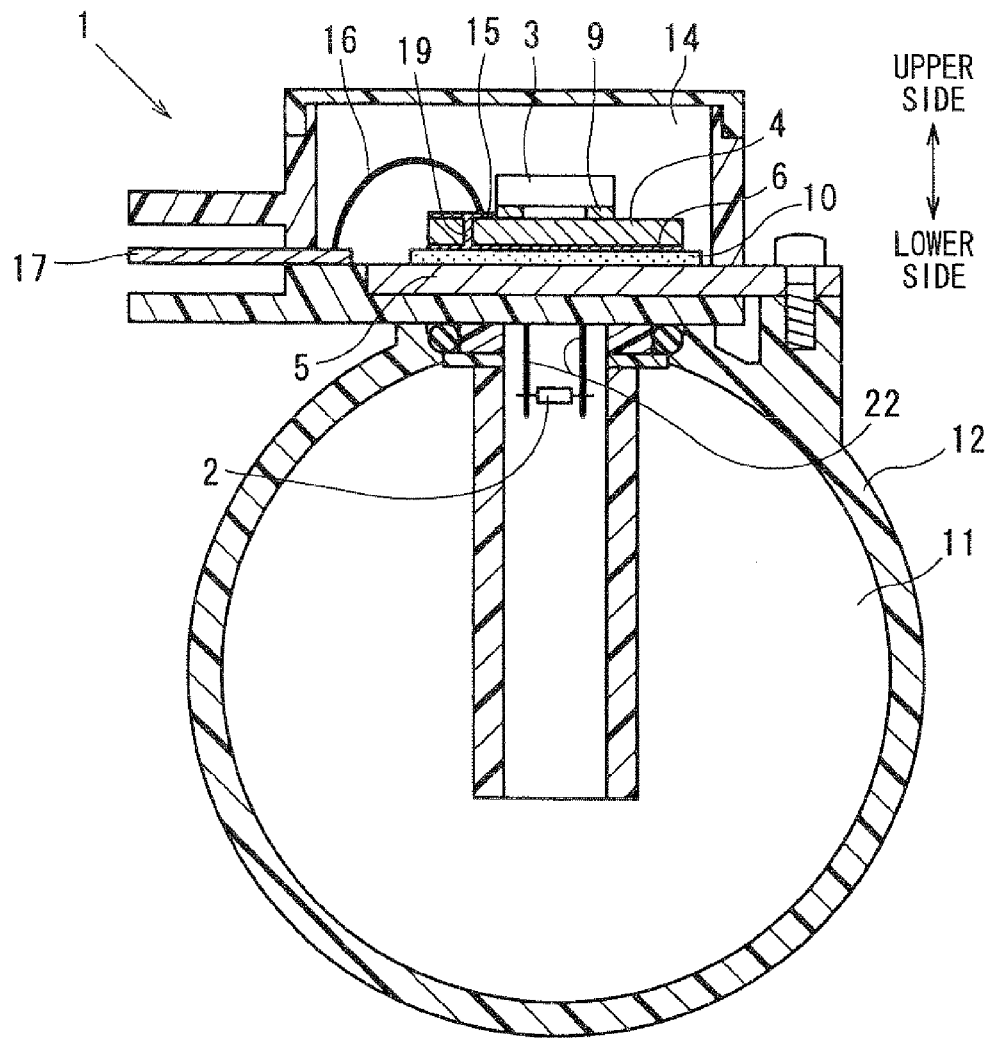
FIG. 1 is a schematic cross-sectional view of an airflow meter according to an embodiment of the invention.

Referring first to FIG. 1, an airflow meter 1 according to an embodiment of the invention is shown as used for detecting rate of air drawn into an engine, for example. A detection signal produced by the airflow meter 1 is used for controlling various elements such as fuel injection.

The airflow meter 1 includes a detecting element 2 for detecting airflow rate, a control IC 3 electrically coupled with the detecting element 2, a circuit board 4 having the control IC 3 on an upper surface thereof a heat sink 5 arranged on a side of a lower surface of the circuit board 4, and a shield part 6 arranged between the circuit board 4 and the heat sink 5. The heat sink 5 has an electrically conductive property and is provided for removing heat from the control IC 3. The shield part 6 has an electrically conductive property and is electrically grounded.

The control IC 3 is coupled with the upper surface of the circuit board 4 by solders 9. The heat sink 5 is attached to the lower surface of the circuit board 4 by a nonconductive adhesive 10 and floated from the ground. Thereby, heat generated by an operation of a transistor (not shown) and the like on the circuit board 4 is removed from the control IC 3 through the heat sink 5. The heat sink 5 also functions as an attachment part of the airflow meter 1 to a tubular passage member 12. The passage member 12 is made of a resin and defines an air passage 11.

The control IC 3 and the circuit board 4 are accommodated in a circuit case 14 made of a resin. In addition, a ground circuit part 15 is formed on the upper surface of the circuit board 4 and is coupled with a connector terminal 17 by a bonding wire 16.

The shield part 6 is made of a thin film metal such as copper. The shield part 6 is integrated with the circuit board 4 to cover the whole area of the lower surface of the circuit board 4. A electrically conductive part 19 penetrates through the circuit board 4 so that the shield part 6 conducts with the ground circuit part 15 through the conductive part 19. Thus, the shield part 6 is electrically grounded through the conductive part 19, the ground circuit part 15, the bonding wire 16, and the connector terminal 17. The shield part 6 is applied with the adhesive 10 so that the circuit board 4 is attached to the heat sink 5 through the shield part 6.

Figure 2:
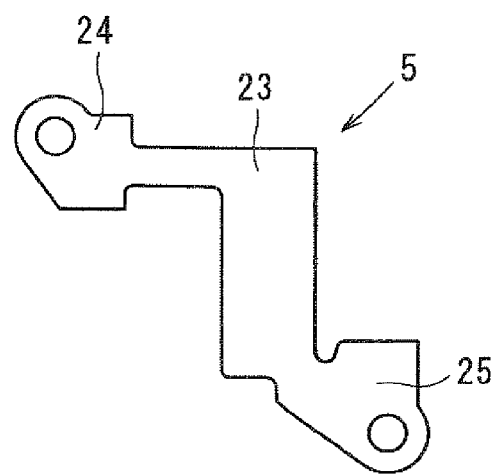
FIG. 2 is a plan view of a heat sink in the airflow meter according to the embodiment.

As shown in FIG. 2, the heat sink 5 has an irregular planer shape for insert molding of the connector terminal 17 and a sensor terminal 22. It should be noted that the irregular shape is defined as opposed to a regular rectangular shape such as a square and a rectangular shape having a horizontal to vertical ratio about one. For example, the irregular shape includes a rectangular shape having a protruding part at a side of the rectangular shape, a rectangular shape having a recess, and a rectangular shape having a horizontal to vertical ratio far from one. In this airflow meter 100, the heat sink 5 has the irregular planer shape including a rectangular part 23, a first protruding part 24, and a second protruding part 25. The rectangular part 23 has a horizontal to vertical ratio far from one. The first protruding part 24 is a connecting terminal attached to one end of the rectangular part 23. The second protruding part 25 is another connecting terminal attached to the other end of the rectangular part 23. Thus, the heat sink 5 easily receives an external noise due to an antenna effect.

This airflow meter 1 includes the detecting element 2 for detecting airflow rate, the control IC 3 electrically coupled with the detecting element 2, the circuit board 4 having the control IC 3 on the upper surface thereof, the heat sink 5 arranged on the side of the lower surface of the circuit board 4, and the shield part 6 arranged between the circuit board 4 and the heat sink 5. The heat sink 5 has a conductive property and is provided for removing heat from the control IC 3. The shield part 6 has a conductive property and is electrically grounded. Thus, even when the heat sink 5 is put in an electrically floating state to be prevented from receiving the external noise, and static electricity cannot be released from the heat sink 5, the internal noise due to a charge of the heat sink 5 is shielded by the shield part 6. Thereby, the internal noise does not affect the control IC 3. As a result, the airflow meter 1 prevents both the external noise and the internal noise from affecting the control IC 3.

In addition, the heat sink 5 has the irregular planar shape for easily receiving the external noise. The external noise received by the heat sink 5 is prevented from affecting the control IC 3 by the heat sink 6, which is arranged between the control IC 3 and the heat sink 5 and is electrically grounded. Thus, the airflow meter 1 effectively prevents both the external noise and the internal noise from affecting the control IC 3.

Other Embodiments

Figure 3:
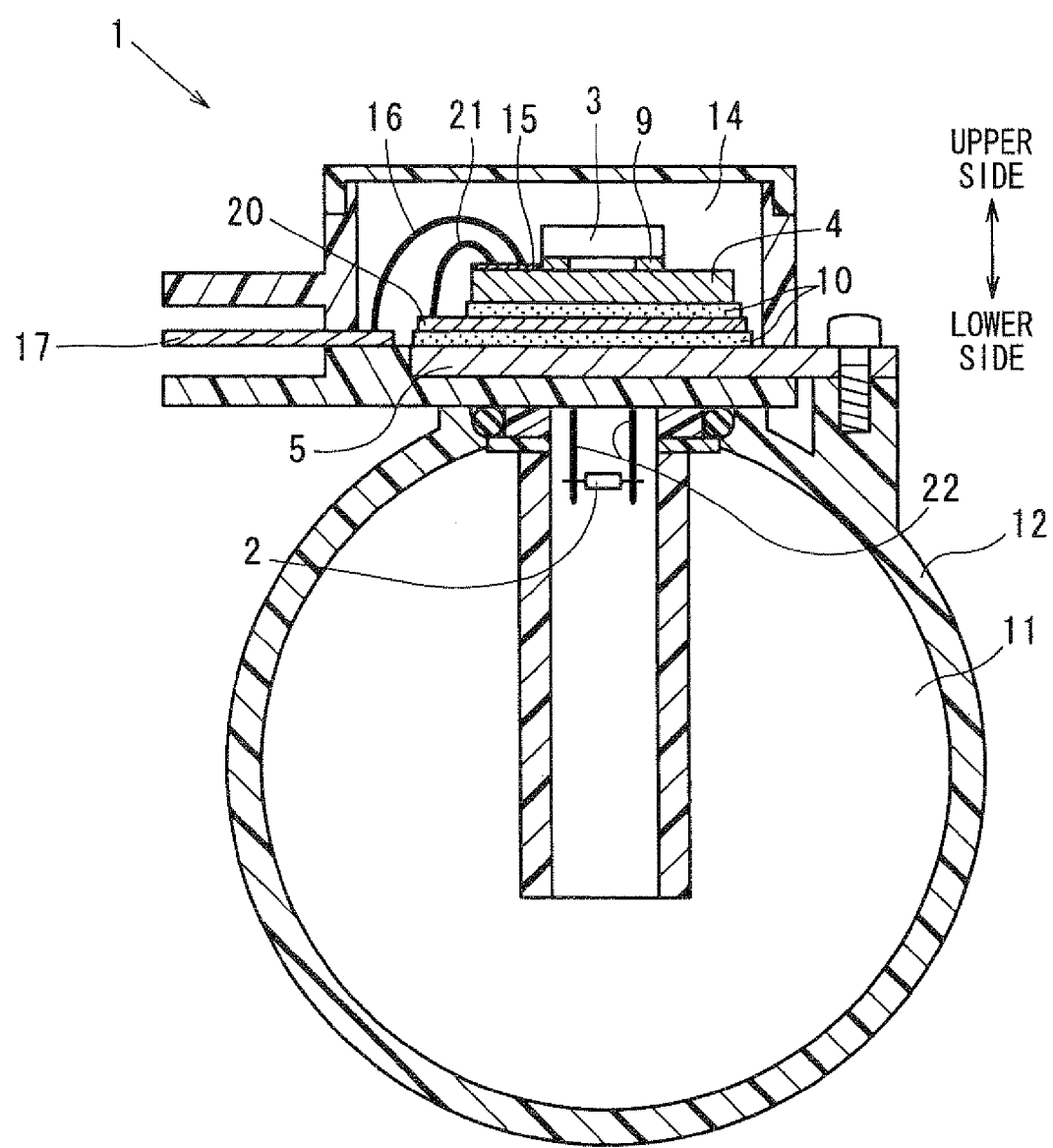
FIG. 3 is a schematic cross-sectional view of an airflow meter according to a modification of the embodiment.
Figure 4:
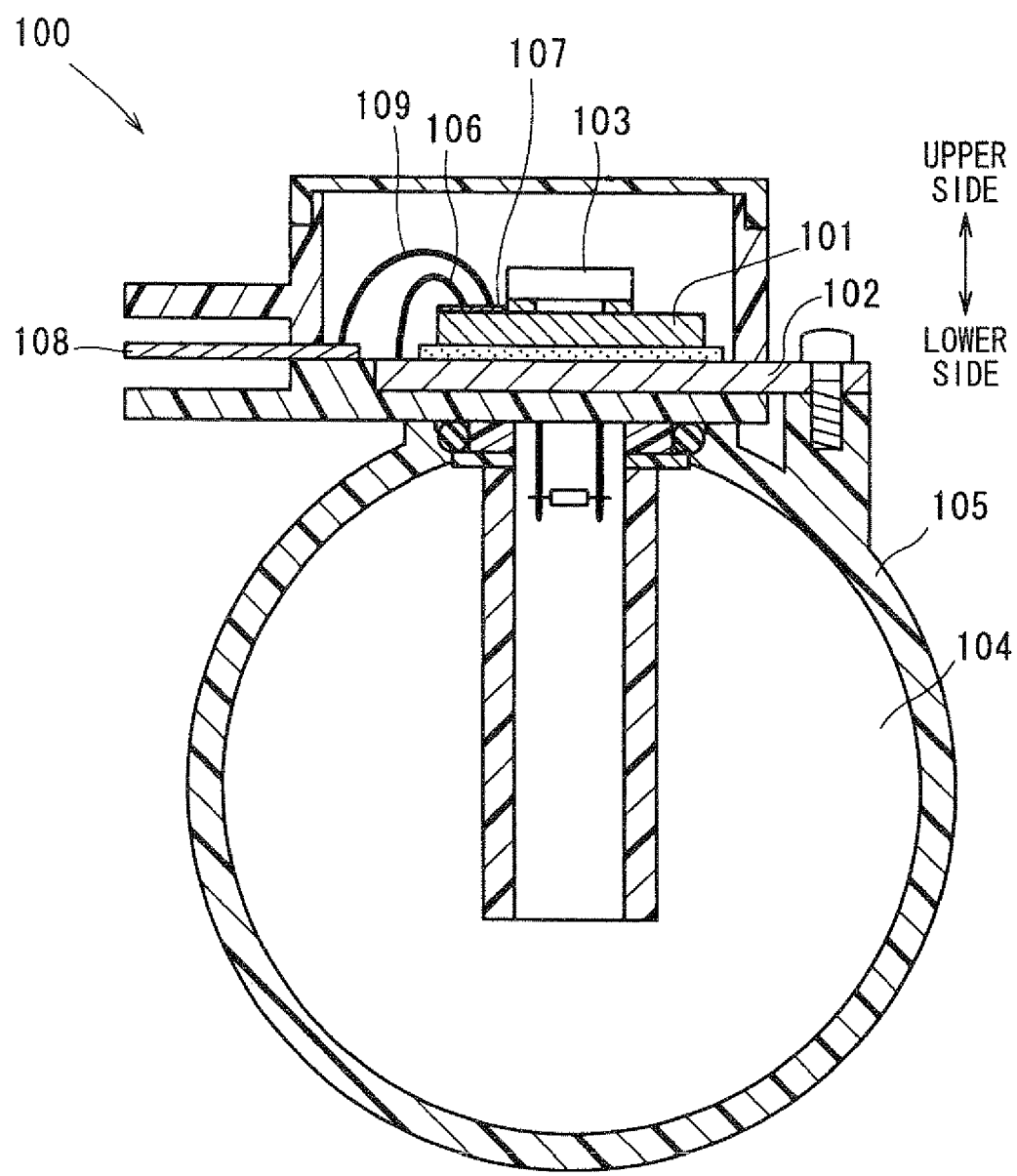
FIG. 4 is a schematic cross-sectional view of an airflow meter according to a prior art.
Figure 5:
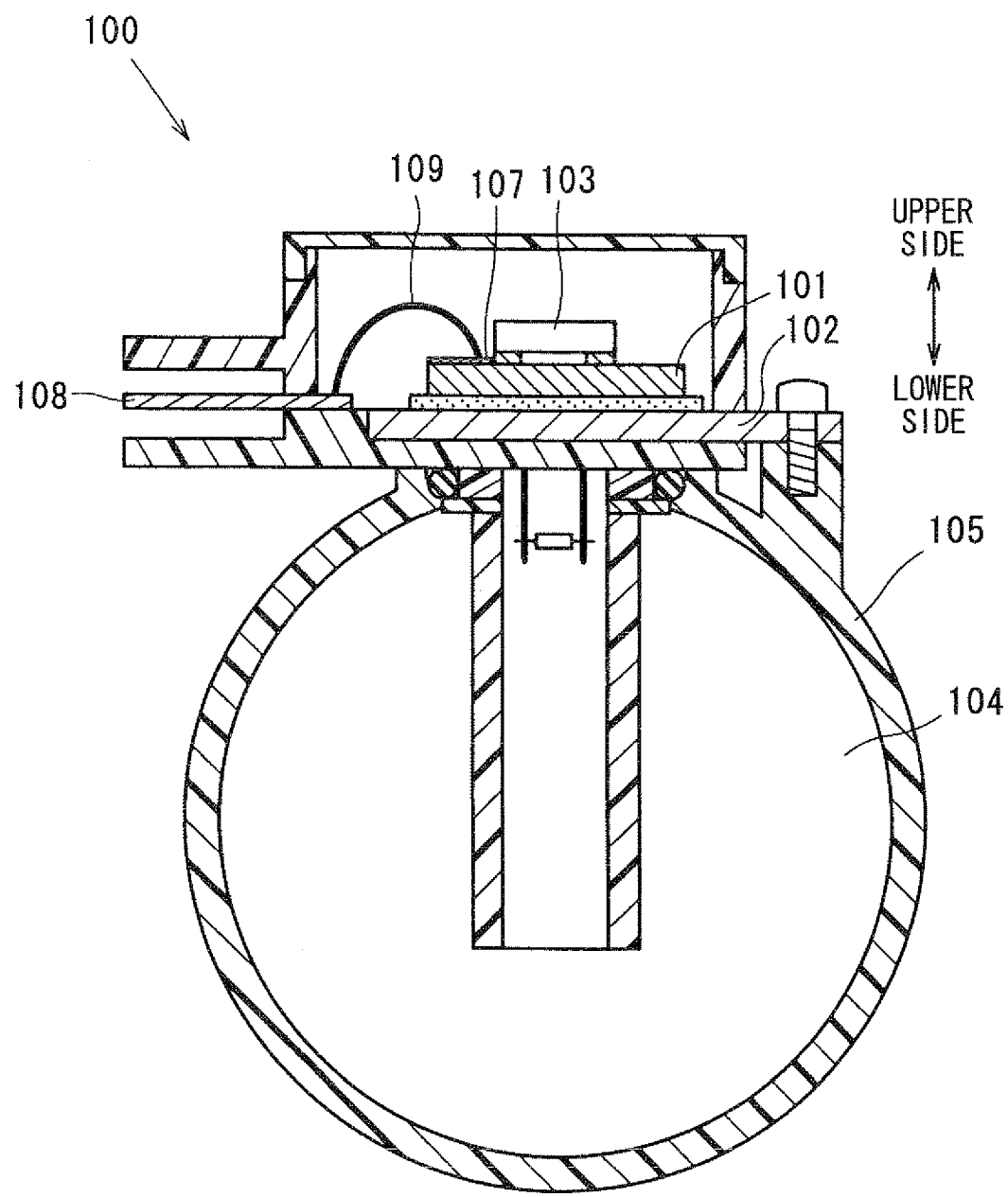
FIG. 5 is a schematic cross-sectional view of an airflow meter according to another prior art.

As shown in FIG. 3, the shield part 6 may be made of a conductive plate member 20 having a certain thickness, instead of the thin film metal in FIG. 1. In this case, an upper surface of the plate member 20 is attached to the circuit board 4 and a lower surface of the plate member 20 is attached to the heat sink 5 through the nonconductive adhesives 10. In addition, the plate member 20 is coupled with the ground circuit part 15 by another bonding wire 21 so that the shield part 6 (i.e., the plate member 20) is electrically grounded through the bonding wire 21, the ground circuit part 15, the bonding wire 16, and the connector terminal 17.

The shield part 6 is not required for covering the whole area of the lower surface of the circuit board 4. The shield part 6 can shield the internal noise when the shield part has an area at least to prevent a vertical projection from the control IC 3 to the heat sink 5. Specifically, the shield part 6 is preferred to have an area larger than that of the control IC 3 and to be arranged to cover the whole area of the control IC 3 in a direction that the control IC 3 and the shield part 6 are stacked.

Such changes and modifications are to be understood as being within the scope of the present invention as defined by the appended claims.

What is claimed is:

1. An airflow meter comprising:
   a detecting element for detecting airflow rate;
   a control integrated circuit electrically coupled with the detecting element,
   a circuit board having a first surface and a second surface opposing each other, and having the control integrated circuit on the first surface;
   a heat sink having an electrically conductive property, arranged on a side of the second surface for removing heat from the control integrated circuit, and being floated from a ground; and
   a shield part arranged between the circuit board and the heat sink, wherein the shield part has an electrically conductive property and is electrically grounded.

2. The airflow meter according to claim 1, wherein:
   the shield part has an area larger than an area of the control integrated circuit; and
   the shield part is arranged to cover the whole area of the control integrated circuit in a direction that the control integrated circuit and the shield part are stacked.

3. The airflow meter according to claim 1, further comprising:
   a ground circuit part arranged on the first surface of the circuit board; and
   a conductive part penetrating through the circuit board from the first surface to the second surface, wherein:
   the shield part is attached to the second surface of the circuit board to conduct with the ground circuit part through the conductive part.

4. The airflow meter according to claim 1, wherein:
   the heat sink has an irregular planer shape.

5. The airflow meter according to claim 4, wherein:
   the irregular planer shape includes at least one of a rectangular shape having a protruding part at a side of the rectangular shape, a rectangular shape having a recess, and a rectangular shape having a horizontal to vertical ratio far from one.

6. The airflow meter according to claim 1, further comprising:
   a nonconductive adhesive arranged between the shield part and the heat sink.

7. The airflow meter according to claim 1, further comprising:
   a first nonconductive adhesive arranged between the second surface of the circuit board and the shield part; and
   a second nonconductive adhesive arranged between the shield part and the heat sink.

8. The airflow meter according to claim 3, further comprising:
   a connector terminal; and
   a bonding wire coupling the ground circuit part and the connector terminal, wherein:
   the shied pad is electrically grounded through the conductive part, the ground circuit part, the bonding wire, and the connector terminal.

9. The airflow meter according to claim 1, further comprising:
   a ground circuit part arranged on the first surface of the circuit board;
   a connector terminal;
   a first bonding wire coupling the shield part and the ground circuit part; and
   a second bonding wire coupling the ground circuit part and the connector terminal, wherein:
   the shied part is electrically grounded through the first bonding wire, the ground circuit part, the second bonding wire, and the connector terminal.

* * * * *